UNITED STATES PATENT OFFICE.

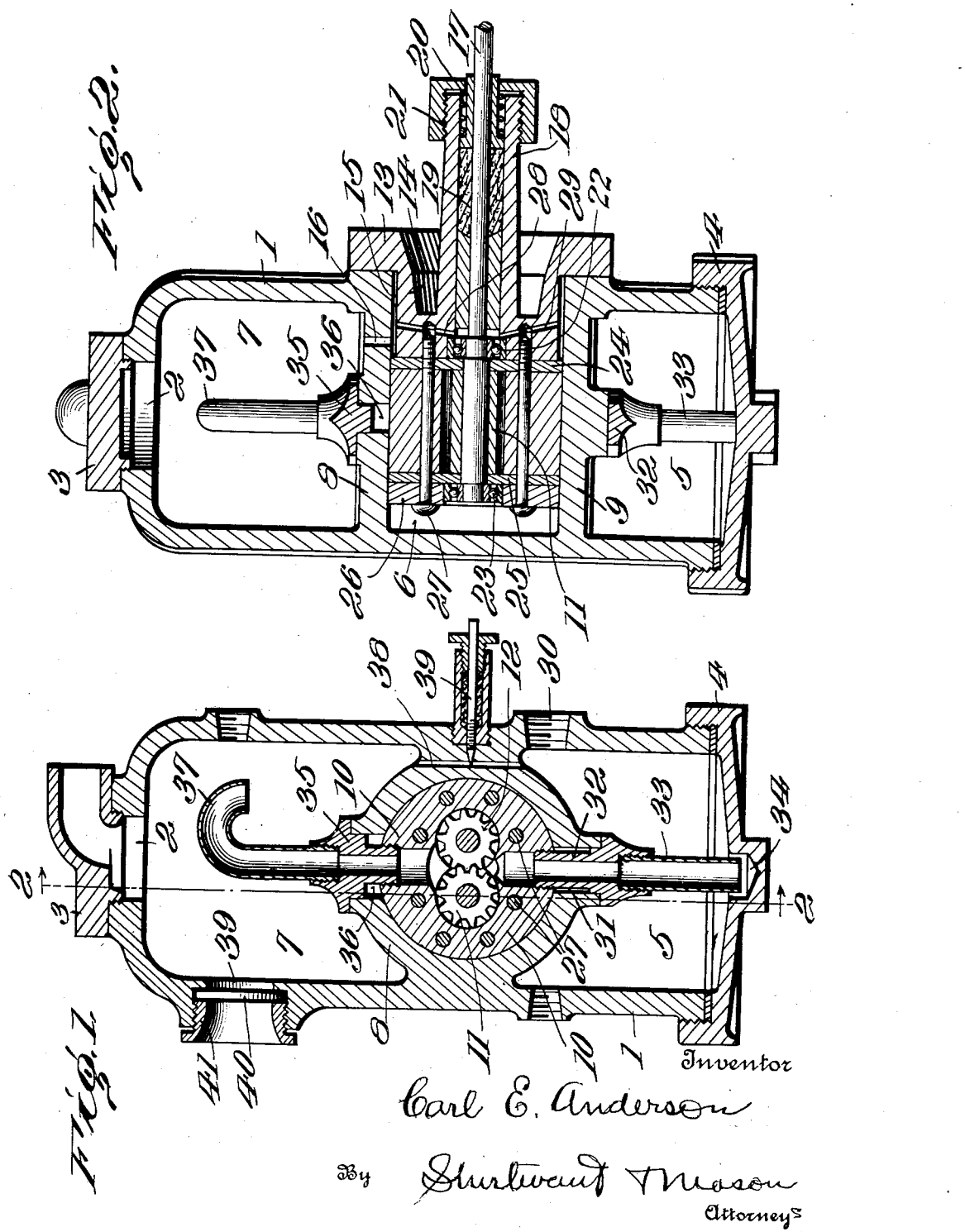
C. E. ANDERSON.
GAS PUMP FOR REFRIGERATING SYSTEMS.
APPLICATION FILED MAY 19, 1920.
1,395,547. Patented Nov. 1, 1921.
Inventor
Carl E. Anderson
By Sturtevant & Mason
Attorneys

CARL E. ANDERSON, OF MAYWOOD, ILLINOIS.

GAS-PUMP FOR REFRIGERATING SYSTEMS.

1,395,547.  Specification of Letters Patent.  Patented Nov. 1, 1921.

Application filed May 19, 1920. Serial No. 382,470.

*To all whom it may concern:*

Be it known that I, CARL E. ANDERSON, a citizen of the United States, residing at Maywood, in the county of Cook, State of Illinois, have invented certain new and useful Improvements in Gas-Pumps for Refrigerating Systems, of which the following is a description, reference being had to the accompanying drawing and to the figures of reference marked thereon.

The invention relates to new and useful improvements in gas pumps for refrigerating systems, and more particularly to a household refrigerating system.

The gas used in connection with refrigerating systems is often poisonous or of an objectionable odor. One of the objects of the invention is to provide a gas compressor or pump which is gas-tight so that no gas can escape from the pump.

A further object of the invention is to provide a liquid-seal for preventing the escape of the gases from the piston housing or through the bearing for the shaft operating the rotating pistons.

A still further object of the invention is to provide means for more efficiently lubricating the rotating pistons at the bearings thereof.

Another object is to provide means whereby the lubricating oil may be carried into the pump with the gas either in vapor form or a finely divided state, whereby efficient lubrication may be accomplished with a relatively small amount of lubricating oil.

Still another object of the invention is to provide means whereby the lubricating oil passing through the pump with the gas may be automatically returned to the vacuum side of the pump and reused for lubricating purposes.

These and other objects will in part be obvious and will in part be hereinafter more fully disclosed.

In the drawings, which show by way of illustration one embodiment of the invention:—

Figure 1 is a vertical sectional view centrally through the pump at right angles to the axes of the rotating pistons:

Fig. 2 is a sectional view on the line 2—2 of Fig. 1.

The invention broadly consists in a gas pump having a main casing divided into a compression chamber, a pump chamber and a vacuum chamber. The casing of the pump and the partitions forming the pump chamber are preferably one integral structure, and the pump casing is threaded to the base so as to make a very tight joint therewith. In this pump chamber is a housing for the piston which has a very tight fit with the wall of the housing, and openings are formed in the partition wall so that a pipe leading into the compression chamber may be threaded into the piston housing, and a pipe leading to the vacuum chamber may be threaded into the piston housing. Suitable openings are provided so that the gas may pass into the pipe extending into the vacuum chamber through the pump, and out through the pipe extending into the compression chamber. The base of the machine is formed with a central depression, and a pipe extending into the vacuum chamber has its lower end extending a short distance into this depression, the side walls of the pipe being free from the chamber. Lubricating oil in the vacuum chamber will run into this depression and will be taken up by the inrushing gas in more or less of a vapor form or a finely divided state and carried through and lubricate the pump cylinders. The housing for the pump cylinders is held in place by means of a cover plate which projects into the chamber receiving the housing, and the projecting portion of the cover is spaced a slight distance from the wall of the pump chamber. Means is provided whereby the lubricating oil passes into this space between the projection on the cover and the wall of the pump chamber and forms a liquid seal to prevent the escape of gases. Oil ducts are provided so that the oil is conveyed from this space between the projection and the wall of the pump casing to the outer bearings for the pump pistons.

In my copending application, Serial No. 337,632, filed November 13, 1919, I have shown a gas pump of the general construction contained in the present application, and the present application is an improvement on the detailed construction of such pump. The general arrangement of the parts and the general construction form no part of the present invention but is claimed in my copending application above referred to.

Referring more in detail to the drawings, my improved gas pump consists of a main casing 1 which is in the general form of a vertical cylinder having its upper ends closed except for an opening 2 which is in turn closed by a pipe connection 3. This main casing 1 has a threaded connection with the base 4 of the machine, and a suitable gasket may be used so as to secure a tight gas connection between the casing and the base. The pump casing is divided into a vacuum chamber 5, a pump chamber 6 and a compression chamber 7. This is accomplished by partitions 8 and 9 which are formed preferably integral with the main casing 1.

The partitions also are connected, as shown in Fig. 1, and the pump chamber 6 formed by these partitions is bored out so as provide a very true and smooth cylindrical surface. Fitting into the pump chamber is a cylindrical housing 10 for the pump pistons, indicated at 11 and 12. These pump pistons are in the form of intermeshing gears and may be of any desired construction. The housing 10 is ground so as to fit very accurately the inner surface of the pump chamber 6. The housing 10 for the pump pistons is secured to a cover plate 13 which has an inwardly projecting part 14 which is slightly smaller in diameter than the inner wall of the pump chamber 6, thus forming a space or passage 15 adapted to receive lubricating oil flowing into the same through the port 16. This serves as a liquid seal for the cover plate so as to prevent any possible escape of gases through the joint connections of the cover plate and the housing and the casing.

Extending through the cover pate 13 is a shaft 17 and the pump piston 11 is secured to this shaft and operated thereby. This pump piston in turn imparts motion to the pump piston 12. The cover plate 13 has an outwardly projecting sleeve 18 through which the shaft extends, and a packing 19, forced against a bearing sleeve of the shaft by means of a spring 20 and a collar 21, serves to make a tight joint for the shaft. Ball bearings 22 and 23 are provided for the pump pistons. The outer bearing 22 is mounted in the projection 14 of the cover plate. Just inside of this bearing is a hardened wear plate 24. At the other end of the piston housing is a hardened wear plate 25, and a supporting plate 26 in which the bearing 23 is mounted. Bolts 27 clamp this supporting plate, the wear plates and the housing to the cover plate 13 so that they may all be placed in the pump chamber as a unit.

The oil in the passage 15 is led through ports 28 to the ball bearing 22, and the oil slowly passes out from in and about the bearing for the shaft, through the port 29 to the space 15 at the lower side of the projection 14. Thus it is that the bearing is well lubricated and, at the same time, an oil seal is provided to prevent the gas from escaping out through the bearing for the shaft 17.

The gas enters the vacuum chamber through an opening 30. The partition 9 is formed with an opening 31, and a pipe 32 extends through said opening, has a shoulder engagement with the partition, and is threaded into the cylinder housing. This insures a tight connection between the housing and the vacuum chamber so that the gas will pass into the opening in the housing and thus to the rotating pump pistons. Attached to the pipe 32 is an extension pipe 33. The base 4 of the machine is provided with a central depression 34, and the lower end of this pipe 33 projects downwardly into this depression 34 for a short distance. The outer wall of the pipe 33 is spaced from the side walls of the depression so as to permit lubricating oil to pass down into this depression. The gas entering the pump also passes down through the depression, and thence into the pipe 33 and, as a result, the lubricating oil will be carried in vapor form or in a finely divided state with the gas into the pump pistons, pass with the gas in and about the pump pistons, thoroughly lubricating the same, and thence on to the compression chamber.

A pipe connection 35 extends through an opening 36 in the partition 8 and is threaded into the piston housing in the pump chamber. This pipe section 35 has a shoulder engagement with the partition 8. A gooseneck pipe 37 is threaded into this pipe connection 35 and discharges the gas and lubricating oil carried therewith downwardly into the compression chamber. This gooseneck pipe and the connection 35 may be inserted through the opening 2 before the pipe connection 3 is secured to the main casing 1. The lubricating oil accumulating in the bottom of the compression chamber 7 passes through a port 38 into the vacuum chamber at the lower part of the pump casing. A needle valve 39 of the usual construction controls the flow of the lubricating oil through said port 38. By means of this needle valve the flow of the lubricating oil may be so regulated as to provide just the necessary lubrication to the pump pistons.

Through the depression in the base of the machine and the pipe extending into said depression, the foaming of the lubricating oil is brought about through the inrushing gases, and the oil, as above noted, is taken up in vapor form or a finely divided state and carried along with the gases into the pump pistons. A sight opening is provided at 39 which may be closed by means of a glass 40 and a threaded sleeve 41. Through this sight opening the condition of the compression chamber may be inspected at any time.

From the above, it will be apparent that I have provided a gas pump wherein there is little or no chance of the gases which pass through the pump escaping through any of the pump connections or the bearings for the rotating parts. This is accomplished in part through the integral structure of the various parts of the pump and through the liquid seals formed by the lubricating oil. Furthermore, I have provided a pump in which the wear has been reduced to a minimum and the pump is, therefore, adapted for continuous use, day and night if desired, as is sometimes found necessary in connection with refrigerating systems. Then again, I have provided a very efficient lubricating means for lubricating the moving parts and, at the same time, reducing to a minimum the amount of oil which is transmitted by the pump, thus increasing greatly the efficiency of the pump. Through the arrangement of the pipe 33 and the depression in the base of the machine only a small quantity of oil may pass at a given time along with the gas into the pump. If for any reason the needle valve should leak, the lubricating oil will not pass out through the opening 30 as only a small quantity of oil is used, and the vacuum chamber could contain all the oil without its running out through the opening.

It is obvious that minor changes in the details of construction and the arrangement of parts may be made without departing from the spirit of the invention, as set forth in the appended claims.

Having thus described the invention, what is claimed as new is:—

1. A gas pump for refrigerating systems including a casing, a pump chamber therein opening at one face of the casing, a housing or pump body fitting within said pump chamber, rotating pumping pistons in said housing or pump body, means for closing the pump chambers, and means for providing a liquid seal for said closing means.

2. A gas pump for refrigerating systems including a casing, a pump chamber therein opening at one face of the casing, a housing or pump body fitting within said pump chamber, rotating pumping pistons in said housing or pump body, means for closing the pump chambers, and means for providing a liquid seal for said closing means, said closing means having a bearing through which the shaft extends for operating the pump pistons, and means for providing a liquid seal for preventing the escape of the gases through said bearing for said shaft.

3. A gas pump for refrigerating systems including a casing having a pump chamber formed therein, a housing fitting within said pump chamber, pumping pistons located in said housing, means for closing said pump chamber, said housing and pumping pistons being supported by said closing means, said closing means having a bearing, and a shaft extending through said bearing and connected to one of said pumping pistons for operating the same.

4. A gas pump for refrigerating systems including a casing having a pump chamber formed therein, a housing fitting within said pump chamber, pumping pistons located in said housing, means for closing said pump chamber, said housing and pumping pistons being supported by said closing means, said closing means having a bearing, a shaft extending through said bearing and connected to one of said pumping pistons for operating the same, and means for providing a liquid seal for said closing means.

5. A gas pump for refrigerating systems including a casing having a pump chamber formed therein, a housing fitting within said pump chambers, pumping pistons located in said housing, means for closing said pump chamber, said housing and pumping pistons being supported by said closing means, said closing means having a bearing, a shaft extending through said bearing and connected to one of said pumping pistons for operating the same, and means for providing a liquid seal for said closing means and for the bearing for said shaft to prevent escape of the gases from said pump chamber.

6. A gas pump for refrigerating systems including a main casing having an integral partition forming a vacuum chamber, a pump chamber and a compression chamber, said pump chamber being cylindrical and opening at one side only of the casing, a housing fitting within said pump chamber, rotating pumping pistons carried by said housing, a cover plate for closing the opening in said pump chamber and having a portion projecting within said pump chamber, said housing being secured to said cover plate, said cover plate having a bearing, and a shaft extending through said bearing and connected to one of said pumping pistons for operating said pistons.

7. A gas pump for refrigerating systems including a main casing having an integral partition forming a vacuum chamber, a pump chamber and a compression chamber, said pump chamber being cylindrical and opening at one side only of the casing, a housing fitting within said pump chamber, rotating pumping pistons carried by said housing, a cover plate for closing the opening in said pump chamber and having a portion projecting within said pump chamber, said housing being secured to said cover plate, said cover plate having a bearing, a shaft extending through said bearing and connected to one of said pumping pistons for operating said pistons, said projecting portion of the cover plate being spaced from the inner wall of the pump chamber, and means for providing said space with a lubricating oil for sealing said cover plate to prevent the escape of the gases.

8. A gas pump for refrigerating systems including a main casing having an integral partition forming a vacuum chamber, a pump chamber and a compression chamber, said pump chamber being cylindrical and opening at one side only of the casing, a housing fitting within said pump chamber, rotating pumping pistons carried by said housing, a cover plate for closing the opening in said pump chamber and having a portion projecting within said pump chamber, said housing being secured to said cover plate, said cover plate having a bearing, a shaft extending through said bearing and connected to one of said pumping pistons for operating said pistons, said projecting portion of the cover plate being spaced from the inner wall of the pump chamber, means for providing said space with a lubricating oil for sealing said cover plate to prevent the escape of the gases, and means for directing the lubricating oil from said space to the end of the bearing for said shaft for sealing said bearing and preventing the escape of gases therethrough.

9. A gas pump for refrigerating systems including a casing, a cylindrical pump chamber, a housing fitting within said chamber, rotating pumping pistons located in said housing, a wear plate at each end of said housing covering the ends of the rotating pistons, a cover plate for the pump chamber having a projecting portion extending into the pump chamber, said projecting portion carrying ball bearings for the pumping pistons, a retaining plate at the other end of the pumping pistons from said cover plate, ball bearings carried thereby for said rotating pistons, means for securing said retaining plate and housing to said cover plate whereby the housing and pumping pistons form a unitary structure with said cover plate.

10. A gas pump for refrigerating systems including a casing, a cylindrical pump chamber, a housing fitting within said chamber, rotating pumping pistons located in said housing, a wear plate at each end of said housing covering the ends of the rotating pistons, a cover plate for the pump chamber having a projecting portion extending into the pump chamber, said projecting portion carrying ball bearings for the pumping pistons, a retaining plate at the other end of the pumping pistons from said cover plate, ball bearings carried thereby for said rotating pistons, means for securing said retaining plate and housing to said cover plate whereby the housing and pumping pistons form a unitary structure with said cover plate, said cover plate having an outwardly projecting sleeve forming an elongated bearing for a driving shaft, a driving shaft extending therethrough and connected to one of said pumping pistons for operating the same.

11. A gas pump for refrigerating systems including a casing, a cylindrical pump chamber, a housing fitting within said chamber, rotating pumping pistons located in said housing, a wear plate at each end of said housing covering the ends of the rotating pistons, a cover plate for the pump chamber having a projecting portion extending into the pump chamber, said projecting portion carrying ball bearings for the pumping pistons, a retaining plate at the other end of the pumping pistons from said cover plate, ball bearings carried thereby for said rotating pistons, means for securing said retaining plate and housing to said cover plate whereby the housing and pumping pistons form a unitary structure with said cover plate, said inwardly projecting portion of the cover plate being spaced from the inner wall of the pump chamber, and means for supplying lubricating oil thereto for forming a liquid seal to prevent the escape of gases.

12. A gas pump for refrigerating systems including a casing, a cylindrical pump chamber, a housing fitting within said chamber, rotating pumping pistons located in said housing, a wear plate at each end of said housing covering the ends of the rotating pistons, a cover plate for the pump chamber having a projecting portion extending into the pump chamber, said projecting portion carrying ball bearings for the pumping pistons, a retaining plate at the other end of the pumping pistons from said cover plate, ball bearings carried thereby for said rotating pistons, means for securing said retaining plate and housing to said cover plate whereby the housing and pumping pistons form a unitary structure with said cover plate, said inwardly projecting portion of the cover plate being spaced from the inner wall of the pump chamber, means for supplying lubricating oil thereto for forming a liquid seal to prevent the escape of gases, and ports leading from said space to the end of the bearing for the shaft for forming a liquid seal to prevent the escape of gases through said bearing.

13. A gas pump for refrigerating systems including a main casing, partitions centrally thereof and integral therewith forming a central cylindrical pump chamber, a compression chamber and a vacuum chamber separated from each other by said partitions and pump chamber, a housing fitting within said pump chamber, coöperating rotating pistons located in said housing, said pump chamber opening at one side of said casing only, a cover plate for closing said opening, a shaft extending through said cover plate and connected to one of said pumping pistons for operating the same, a pipe section extending through an opening in one of said partitions and threaded into said housing, said pipe section having an extension extending into said compression chamber, a pipe section extending through an opening in the other partition and threaded into the housing, said pipe section having an extension extending into the vacuum chamber, a brace threaded onto said casing and closing the bottom thereof, said brace having a depression into which the pipe section in the vacuum chamber extends, said pipe section being smaller in diameter than said depression.

14. A gas pump for refrigerating systems including a casing having a pump chamber, rotating pistons located in said pump chamber, a vacuum chamber, a port leading from the vacuum chamber into said pump chamber, a pipe connected with said port and extending downwardly into a restricted depression in the base of the casing whereby the gas passing from the vacuum chamber into said pump chamber through said pipe will take up and carry along in suspension oil in vapor or a finely divided state for lubricating the pumping pistons.

15. A gas pump for refrigerating systems including in combination, a casing, a base therefor, a pump chamber, a housing within said pump chamber, pumping pistons located within said housing, a vacuum chamber at one side of said pump chamber, a port connecting said vacuum chamber with said pistons, a compression chamber at the other side of said pump chamber, a port connecting said pistons with said compression chamber, a pipe connected with the port leading to the vacuum chamber and extending into a restricted depression in the base whereby the lubricating oil may be carried with the gas in a finely divided state through the pumping pistons, and means for connecting the compression chamber with the vacuum chamber whereby the lubricating oil passing into the compression chamber may flow back into the vacuum chamber.

In testimony whereof I affix my signature.

CARL E. ANDERSON.